United States Patent
Ito et al.

(10) Patent No.: US 7,653,254 B2
(45) Date of Patent: Jan. 26, 2010

(54) IMAGE CODING APPARATUS AND IMAGE CODING METHOD

(75) Inventors: Naoki Ito, Ohta-Ku (JP); Osamu Iinuma, Kawasaki (JP); Shinichi Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 632 days.

(21) Appl. No.: 11/225,170

(22) Filed: Sep. 14, 2005

(65) Prior Publication Data

US 2006/0056713 A1    Mar. 16, 2006

(30) Foreign Application Priority Data

Sep. 14, 2004    (JP)    ............... 2004-267509

(51) Int. Cl.
*G06K 9/36*    (2006.01)
*G06K 9/46*    (2006.01)

(52) U.S. Cl. ...................... 382/239; 382/232
(58) Field of Classification Search ........................ None
See application file for complete search history.

(56) References Cited

U.S. PATENT DOCUMENTS

| | | | | |
|---|---|---|---|---|
| 6,097,845 | A * | 8/2000 | Ng et al. ...................... | 382/239 |
| 6,175,388 | B1 * | 1/2001 | Knox et al. ................... | 348/569 |
| 6,785,424 | B1 * | 8/2004 | Sakamoto .................... | 382/244 |
| 7,062,087 | B1 * | 6/2006 | Varga ........................... | 382/166 |
| 7,106,909 | B2 | 9/2006 | Satoh et al. .................. | 382/239 |
| 7,106,911 | B2 | 9/2006 | Ohta et al. .................... | 382/251 |
| 7,257,264 | B2 | 8/2007 | Nakayama et al. ........... | 382/239 |
| 7,305,137 | B2 | 12/2007 | Isshiki ........................ | 382/245 |
| 2003/0043905 | A1 | 3/2003 | Nakayama et al. ........... | 382/239 |
| 2003/0086127 | A1 | 5/2003 | Ito et al. ....................... | 382/166 |
| 2003/0086597 | A1 | 5/2003 | Ohta et al. .................... | 382/280 |
| 2003/0164975 | A1 | 9/2003 | Aoyagi et al. ............... | 358/1.15 |
| 2003/0169934 | A1 | 9/2003 | Naito ........................... | 382/239 |
| 2003/0194138 | A1 | 10/2003 | Osawa et al. ................. | 382/239 |
| 2003/0202582 | A1 | 10/2003 | Satoh ........................... | 382/232 |
| 2003/0228063 | A1 | 12/2003 | Nakayama et al. ........... | 382/232 |
| 2004/0062522 | A1 | 4/2004 | Kitora et al. .................. | 386/46 |
| 2006/0023957 | A1 | 2/2006 | Ito ............................... | 382/232 |
| 2006/0045362 | A1 | 3/2006 | Ito et al. ....................... | 382/232 |
| 2006/0050975 | A1 | 3/2006 | Ito et al. ....................... | 382/232 |
| 2008/0080780 | A1 | 4/2008 | Isshiki ......................... | 382/245 |

FOREIGN PATENT DOCUMENTS

| | | | |
|---|---|---|---|
| JP | 2003-101793 A | 4/2003 |
| JP | 2004-214738 A | 7/2004 |

* cited by examiner

*Primary Examiner*—Yuzhen Ge
(74) *Attorney, Agent, or Firm*—Fitzpatrick, Cella, Harper & Scinto

(57) ABSTRACT

A variable $c1$ is counted up by one for the Nth bit in attribute information="1", and a variable $c0$ is counted up by one for the Nth bit="0" (S402). When the total code amount of the coding results of pieces of attribute information which have been coded up to now has exceeded a predetermined threshold, a value held by the variable $c0$ at this time and that held by the variable $c1$ are compared with each other to determine which of "1" or "0" is set for the Nth bit of subsequently input attribute information (S405).

7 Claims, 8 Drawing Sheets

FIG. 3

| bit7 | bit6 | bit5 | bit4 | bit3 | bit2 | bit1 | bit0 |
|---|---|---|---|---|---|---|---|
| EDGE | TEXT / PHOTO | HALFTONE | PDL / SCAN | VECTOR | OBJECT | PROCESS A | ACHROMATIC COLOR |

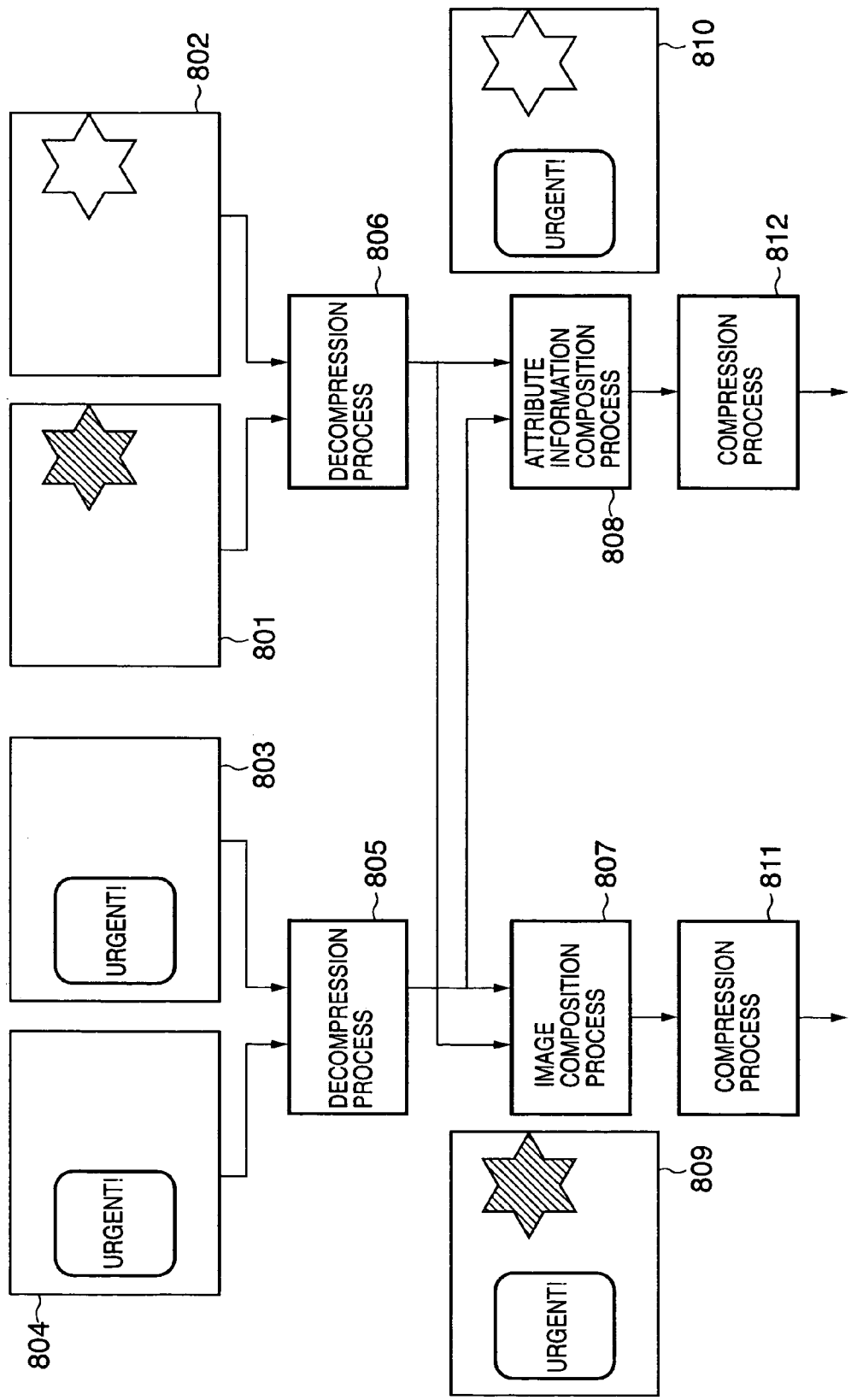

IMAGE CODING APPARATUS AND IMAGE CODING METHOD

FIELD OF THE INVENTION

The present invention relates to a technique of coding attribute information of an image.

BACKGROUND OF THE INVENTION

Conventionally, compression of information representing the attribute of each pixel which forms an image, i.e., so-called attribute information uses lossless coding so as not to change the attribute information. However, the compression ratio of lossless coding changes depending on the contents of data to be coded (in this case, attribute information). In an application of lossless coding, it is difficult to control the coded data amount.

In this situation, as a method of controlling the code amount of attribute information, there has conventionally been disclosed a technique of suppressing variations in attribute information to decrease the number of types of information, and thereby increasing the coding efficiency in compressing the attribute information.

According to the prior art, however, when coded data of attribute information does not fall within a target data amount, the information is changed to preset attribute information, and the meaning of the changed attribute information greatly deviates from the original one, degrading the image quality in a subsequent image process and the like.

SUMMARY OF THE INVENTION

The present invention has been made to overcome the conventional drawbacks, and has as its object to provide a technique of, when the code amount of attribute information does not fall within a predetermined amount, changing the attribute information in consideration of the property of the image, and making the code amount fall within the predetermined amount.

In order to achieve an object of the present invention, for example, an image coding apparatus of the present invention comprises the following arrangement.

That is, an image coding apparatus characterized by comprising:

input means for inputting attribute information which is set for each pixel that forms an image and which represents an attribute of the pixel;

coding means for coding the attribute information input by the input means;

code amount monitoring means for obtaining a total code amount by adding a code amount of coded data of the attribute information coded by the coding means and a previously obtained code amount;

counting means for counting the number of pieces of attribute information, in which the bit value of a predetermined bit in a bit string that forms attribute information is a predetermined value;

change means for changing, on the basis of a count value, a value of the predetermined bit in attribute information input by the input means when the total code amount obtained by the code amount monitoring means reaches a predetermined amount;

coding control means for causing the coding means to code attribute information changed by the change means; and output means for outputting a coding result by the coding means.

In order to achieve an object of the present invention, for example, an image coding apparatus of the present invention comprises the following arrangement.

That is, an image coding apparatus characterized by comprising:

input means for inputting attribute information which is set for each pixel that forms an image and which represents an attribute of the pixel;

holding means for holding the attribute information input by the input means;

coding means for coding the attribute information input by the input means;

code amount monitoring means for obtaining a total code amount by adding a code amount of coded data of the attribute information coded by the coding means and a previously obtained code amount;

counting means for counting the number of pieces of attribute information, in which the bit value of a predetermined bit in a bit string that forms attribute information is a predetermined value;

first change means for changing, on the basis of a count value, a value of the predetermined bit in attribute information held by the holding means when the total code amount obtained by the code amount monitoring means reaches a predetermined amount;

second change means for changing, on the basis of the count value, a value of the predetermined bit in attribute information input by the input means when the code amount obtained by the code amount monitoring means reaches the predetermined amount;

coding control means for causing the coding means to code attribute information changed by the first change means or the second change means; and output means for outputting a coding result by the coding means.

In order to achieve an object of the present invention, for example, an image coding apparatus of the present invention comprises the following arrangement.

That is, an image coding apparatus characterized by comprising:

input means for inputting attribute information which is set for each pixel that forms an image and which represents an attribute of the pixel;

coding means for coding the attribute information input by the input means;

code amount monitoring means for obtaining a total code amount by adding a code amount of coded data of the attribute information coded by the coding means and a previously obtained code amount;

change means for changing, to a designated value, a value of a predetermined bit in attribute information input by the input means when the total code amount obtained by the code amount monitoring means reaches a predetermined amount;

coding control means for causing the coding means to code attribute information changed by the change means after the total code amount obtained by the code amount monitoring means reaches the predetermined amount; and output means for outputting a coding result by the coding means.

In order to achieve an object of the present invention, for example, an image coding method of the present invention comprises the following arrangement.

That is, an image coding method characterized by comprising:

an input step of inputting attribute information which is set for each pixel that forms an image and which represents an attribute of the pixel;

a coding step of coding the attribute information input in the input step;

a code amount monitoring step of obtaining a total code amount by adding a code amount of coded data of the attribute information coded in the coding step and a previously obtained code amount;

a counting step of counting the number of pieces of attribute information, in which the bit value of a predetermined bit in a bit string that forms attribute information is a predetermined value;

a change step of changing, on the basis of a count value, a value of the predetermined bit in attribute information input in the input step when the total code amount obtained in the code amount monitoring step reaches a predetermined amount;

a coding control step of coding, in the coding step, attribute information changed in the change step; and an output step of outputting a coding result in the coding step.

In order to achieve an object of the present invention, for example, an image coding method of the present invention comprises the following arrangement.

That is, an image coding method characterized by comprising:

an input step of inputting attribute information which is set for each pixel that forms an image and which represents an attribute of the pixel;

a holding step of holding the attribute information input in the input step;

a coding step of coding the attribute information input in the input step;

a code amount monitoring step of obtaining a total code amount by adding a code amount of coded data of the attribute information coded in the coding step and a previously obtained code amount;

a counting step of counting the number of pieces of attribute information in which the bit value of a predetermined bit in a bit string that forms attribute information is a predetermined value;

a first change step of changing, on the basis of a count value, a value of the predetermined bit in attribute information held in the holding step when the total code amount obtained in the code amount monitoring step reaches a predetermined amount;

a second change step of changing, on the basis of the count value, a value of the predetermined bit in attribute information input in the input step when the code amount obtained in the code amount monitoring step reaches the predetermined amount;

a coding control step of coding, in the coding step, attribute information changed in the first change step and the second change step; and an output step of outputting a coding result in the coding step.

In order to achieve an object of the present invention, for example, an image coding method of the present invention comprises the following arrangement.

That is, an image coding method characterized by comprising:

an input step of inputting attribute information which is set for each pixel that forms an image and which represents an attribute of the pixel;

a coding step of coding the attribute information input in the input step;

a code amount monitoring step of obtaining a total code amount by adding a code amount of coded data of the attribute information coded in the coding step and a previously obtained code amount;

a change step of changing, to a designated value, a value of a predetermined bit in attribute information input in the input step when the total code amount obtained in the code amount monitoring step reaches a predetermined amount;

a coding control step of coding, in the coding step, attribute information changed in the change step when the total code amount obtained in the code amount monitoring step reaches the predetermined amount; and an output step of outputting a coding result in the coding step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a table showing an example of the structure of attribute information;

FIG. 8 is a diagram showing the flow of a composition process for two images to be composited.

DETAILED DESCRIPTION OF THE PREFERRED EMBODIMENTS

Preferred embodiments of the present invention will now be described in detail in accordance with the accompanying drawings.

First Embodiment

Figure 1:
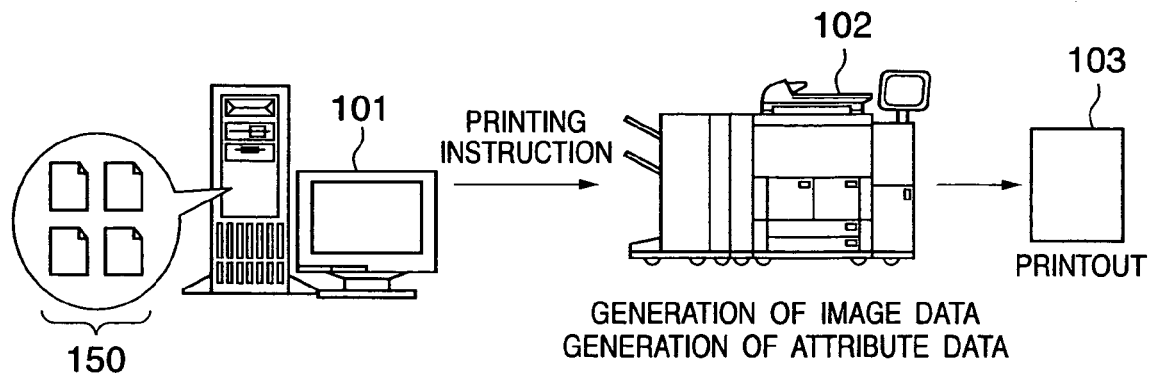
FIG. 1 is a view showing a series of processes in which a computer such as a PC (Personal Computer) or WS (Work Station) causes an apparatus having a printing function to print.

FIG. 1 is a view showing a series of processes in which a computer such as a PC (Personal Computer) or WS (Work Station) causes an apparatus having a printing function to print.

In FIG. 1, reference numeral 101 denotes a computer such as a PC or WS; 102, a multi-functional peripheral as an example of an apparatus having the printing function; and 103, a paper medium (printed product) as a result of printing. Data 150 created by application software or the like is saved in the computer 101. To print the data 150, the computer 101 transmits a printing instruction together with the data 150 to the multi-functional peripheral 102. As is well known, in transmission, data to be printed and printing instruction content data undergo a predetermined conversion process by "driver software of the multi-functional peripheral 102" that is installed in the computer 101, and then are transmitted to the multi-functional peripheral 102.

Upon reception of the data to be printed, the multi-functional peripheral 102 renders the data as an image in the memory, and creates attribute information (attribute data) for each pixel which forms the image. The attribute information represents the attribute of a corresponding pixel, and shows whether a corresponding pixel forms a text or photographic area and whether the pixel has a chromatic or achromatic color. The attribute represented by attribute information is not particularly limited.

The multi-functional peripheral 102 codes the attribute information and rendered image, and temporarily stores them in the memory. The multi-functional peripheral 102 sequentially decodes these data, performs a predetermined image process, and prints on a paper medium on the basis of the processed data, obtaining the printed product 103.

In this way, data transmitted from the computer 101 is printed. Note that the form of inputting data to be printed to the multi-functional peripheral 102 is not limited to the above one. For example, when the scanner function is provided, an image is read by the scanner function. In any case, the multi-functional peripheral 102 performs the above process after inputting an image regardless of the form of inputting an image to the multi-functional peripheral 102.

The multi-functional peripheral 102 will be explained.

Figure 2:
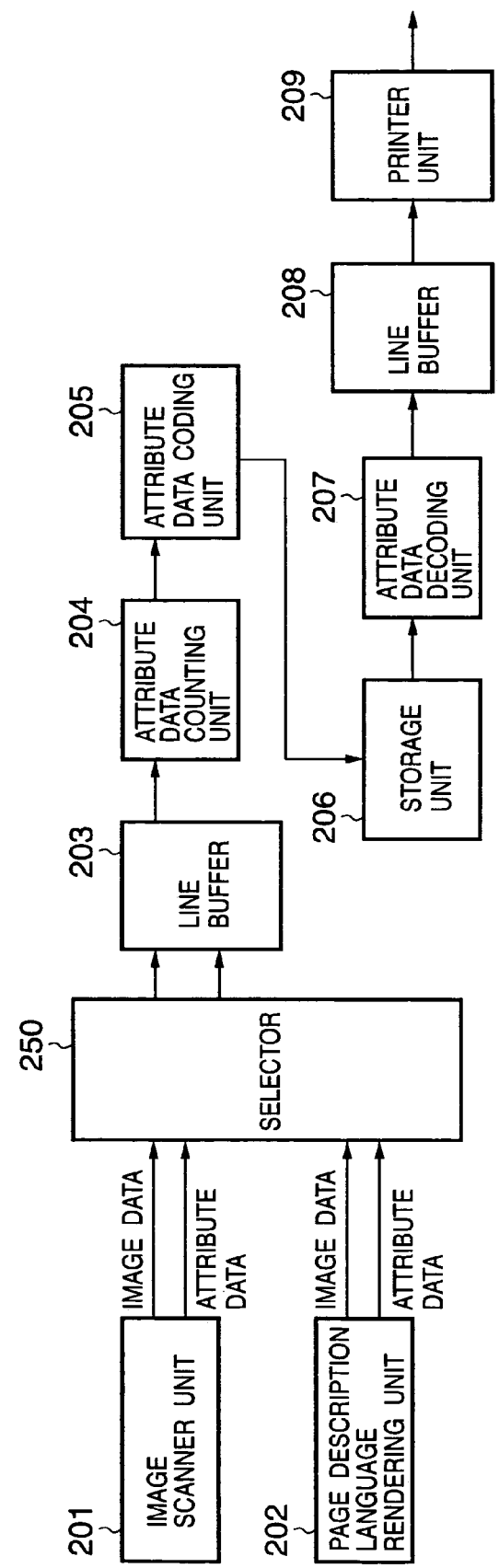
FIG. 2 is a block diagram showing only a part associated with coding of attribute information that is extracted from the functional configuration of a multi-functional peripheral 102.

FIG. 2 is a block diagram showing only a part associated with coding of attribute information that is extracted from the functional configuration of the multi-functional peripheral 102.

An image scanner unit 201 inputs data of an image read from a paper medium or the like by the scan function, and attribute information created for each pixel which forms the image. A page description language rendering unit 202 inputs data of an image rendered on the basis of data transmitted from the computer 101 or the like, and attribute information created for each pixel which forms the image. An attribute data creation process is well known, and a description thereof will be omitted.

The image scanner unit 201 and page description language rendering unit 202 do not simultaneously operate, but only either of them operates. A selector 250 receives image data and attribute data from an active one of the image scanner unit 201 and page description language rendering unit 202, and sends the data to a line buffer 203 on the output stage.

An image sent to the line buffer 203 is coded by an encoder (not shown) in accordance with a coding method such as JPEG.

A coding process for attribute information is executed as follows. An attribute data counting unit 204 reads out each attribute information sent to the line buffer 203, and acquires the bit value of a predetermined bit from a bit string which forms the attribute information. When the acquired bit value is "1", the attribute data counting unit 204 counts up by one a value held by a variable c1 (which is initialized to 0 at the beginning), and when the acquired bit value is "0", counts up by one a value held by a variable c0 (which is initialized to 0 at the beginning).

FIG. 3 is a table showing an example of the structure of attribute information. In FIG. 3, the attribute information is formed from a bit string of 8 bits. For example, the 0th bit (bit0) represents whether a corresponding pixel has a chromatic or achromatic color: "1" means a chromatic color, and "0" means an achromatic color. The sixth bit (bit6) represents whether a corresponding pixel forms a text or photographic area: "1" means a pixel which forms a text area, and "0" means a pixel which forms a photographic area. For each bit which forms attribute information, the attribute of a corresponding pixel is recorded with a bit value. In the following description, attribute information has the structure shown in FIG. 3, but is not limited to this structure and can take any structure.

When, for example, the attribute data counting unit 204 acquires the bit value of the sixth bit (bit6) from a bit string which forms attribute information, the variable c1 holds "the number of pixels which form a text area (among pixels corresponding to pieces of attribute information which have been read out from the line buffer 203 by the attribute data counting unit 204)", and the variable c0 holds "the number of pixels which form a photographic area (among pixels corresponding to pieces of attribute information which have been read out from the line buffer 203 by the attribute data counting unit 204)". The number of pixels which belong to a given attribute can be obtained from a bit number of attribute information from which a bit value is acquired by the attribute data counting unit 204.

An attribute data coding unit 205 codes attribute information which is received from the line buffer 203 via the attribute data counting unit 204. The attribute data coding unit 205 executes a coding process in accordance with lossless coding such as Packbits. The attribute data coding unit 205 obtains the code amount of data which have been coded. Every time the attribute data coding unit 205 performs a coding process, it obtains the code amount of coded data, and adds the code amount to a previously obtained code amount. Consequently, the total code amount of coded data of pieces of attribute information that have been obtained up to now can be attained.

Also, the attribute data coding unit 205 checks whether the current total code amount of coded data of pieces of attribute information has exceeded a predetermined threshold (e.g., 60% of the capacity of a memory which holds coded data). If the total code amount does not exceed the threshold as a result of the check, the attribute data coding unit 205 keeps coding pieces of attribute information sequentially sent from the line buffer 203 via the attribute data counting unit 204 and calculating the total code amount. If the total code amount has exceeded the threshold, the attribute data coding unit 205 executes the following process.

The attribute data coding unit 205 refers to a value counted by the attribute data counting unit 204. For example, when the attribute data counting unit 204 counts the bit value of the sixth bit (bit6) in a bit string which forms attribute information (when the variable c1 holds "the number of pixels which form a text area (among pixels corresponding to pieces of attribute information which have been read out from the line buffer 203 by the attribute data counting unit 204)", and the variable c0 holds "the number of pixels which form a photographic area (among pixels corresponding to pieces of attribute information which have been read out from the line buffer 203 by the attribute data counting unit 204)"), the attribute data coding unit 205 compares a value held by the variable c1 and that held by the variable c0.

When a value held by the variable c1>a value held by the variable c0, in other words, when "the number of pixels which form a text area (among pixels corresponding to pieces of attribute information which have been read out from the line buffer 203 by the attribute data counting unit 204)" is larger than "the number of pixels which form a photographic area (among pixels corresponding to pieces of attribute information which have been read out from the line buffer 203 by the attribute data counting unit 204)", most of pixels corresponding to pieces of attribute information which have been read out from the line buffer 203 by the attribute data counting unit 204 are those which form a text area. From this, subsequent pixels can also be determined to be pixels which form a text area. Since attribute information subsequently input to the line buffer 203 is regarded as attribute information of a pixel which forms a text area, the attribute data coding unit 205 changes the bit value of the sixth bit of the subsequently input attribute information to "1".

To the contrary, when a value held by the variable c1<a value held by the variable c0, in other words, when "the number of pixels which form a text area (among pixels corresponding to pieces of attribute information which have been read out from the line buffer 203 by the attribute data counting unit 204)" is smaller than "the number of pixels which form a photographic area (among pixels corresponding to pieces of attribute information which have been read out from the line buffer 203 by the attribute data counting unit 204)", most of pixels corresponding to pieces of attribute information which have been read out from the line buffer 203 by the attribute data counting unit 204 are those which form a photographic area. From this, subsequent pixels can also be determined to be pixels which form a photographic area. Since attribute information subsequently input to the line buffer 203 is regarded as attribute information of a pixel which forms a photographic area, the attribute data coding unit 205 changes the bit value of the sixth bit of the subsequently input attribute information to "0".

This also applies to a case wherein the attribute data counting unit 204 counts the bit value of another bit in a bit string which forms attribute information.

The attribute data coding unit 205 performs a coding process on the basis of changed attribute information. In this manner, when the code amount of coded data of pieces of attribute information exceeds a predetermined amount, the bit value of a predetermined bit (in the above description, the bit value of the sixth bit) is changed to the same value for pieces of attribute information input to the attribute data coding unit 205 after the code amount exceeds the predetermined amount. Pieces of attribute information input to the attribute data coding unit 205 after the code amount exceeds the predetermined amount have a redundant value at the predetermined bit, thus increasing the coding efficiency.

Hence, after the code amount of coded data of pieces of attribute information exceeds a predetermined amount, the increase rate of the use amount of a memory for holding coded data of attribute information becomes lower, and a code amount upon coding all pieces of attribute information can be suppressed equal to or smaller than the predetermined amount.

Coding results (coded data of pieces of attribute information) by the attribute data coding unit 205 are sequentially sent to a storage unit 206, and temporarily saved in it. The coded data are read out by an attribute data decoding unit 207 in the save order. The attribute data decoding unit 207 decodes the readout coded data in procedures opposite to those of coding performed by the attribute data coding unit 205, and sequentially outputs the decoding results (pieces of attribute information) to a line buffer 208. The attribute information output to the line buffer 208 is read by a printer unit 209, which executes a process of printing on a medium such as paper by using the attribute information in accordance with print data of the image that is sent from an image processing unit (not shown). As described above, a print data generation process based on an image and a printing process using attribute information are well known, and a description thereof will be omitted.

Figure 4:
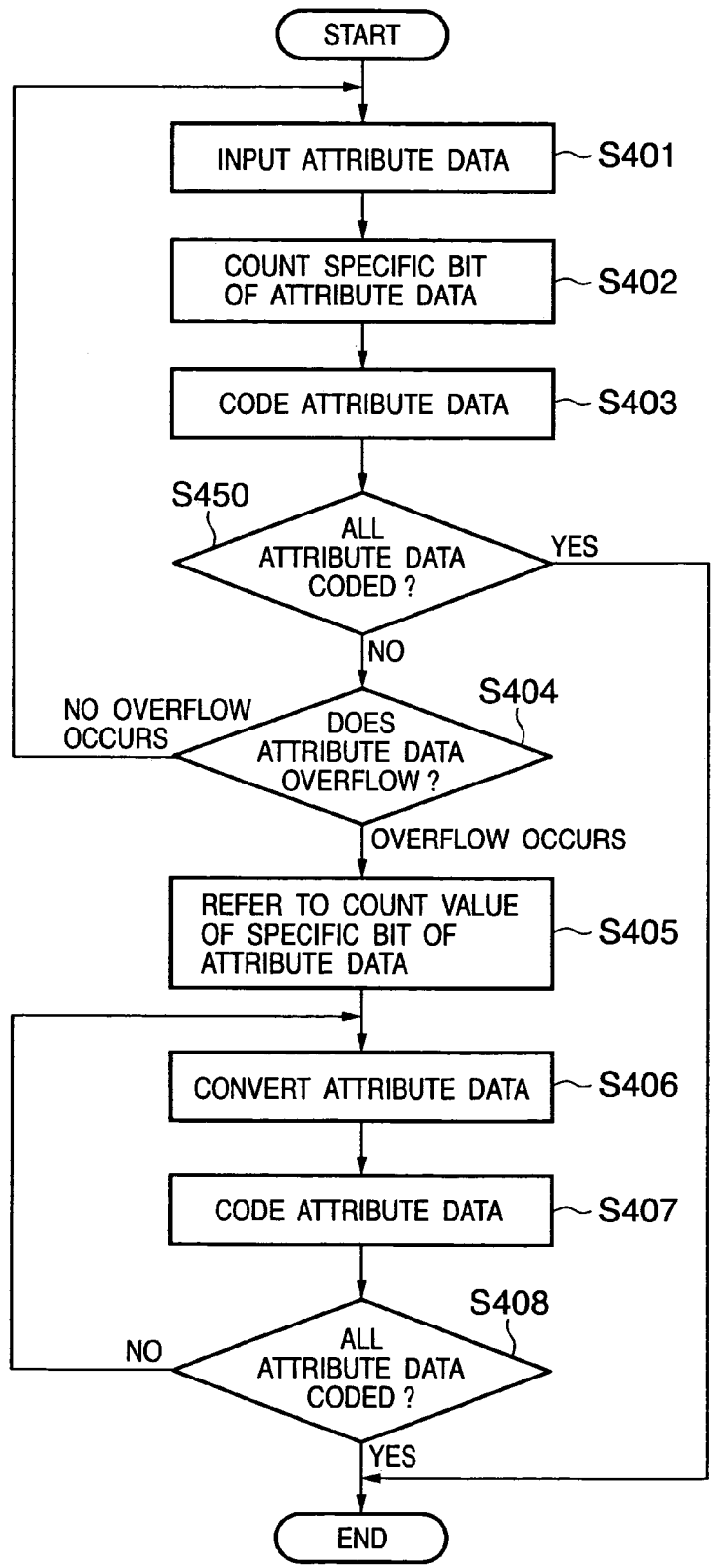
FIG. 4 is a flowchart showing a series of processes associated with coding of attribute information.

FIG. 4 is a flowchart showing the above-described series of processes associated with coding of attribute information. A process in each step has been described in detail above, and will be simply explained. Before the start of the process, values held by the variables c0 and c1 used in the following process are initialized to 0.

When attribute information is received via the selector 250 and line buffer 203 (step S401), the attribute data counting unit 204 refers to the bit value of the Nth bit ($0 \leq N \leq 7$) in the attribute information, and counts up a value held by the variable c1 by one for the bit value="1" or a value held by the variable c0 by one for the bit value="0" (step S402). The attribute data coding unit 205 executes a coding process for the attribute information by lossless coding (step S403). It is determined whether the above process (process in steps S401 to S403) has been done for all pieces of attribute information (pieces of attribute information on all pixels which form one image) (step S450). If the process has been done for all pieces of attribute information, the process ends; if the process has not been done for them, advances to step S404. The attribute data coding unit 205 counts (monitors) the code amount of coding results in step S403, and adds the counted code amount to a previously counted code amount. The attribute data coding unit 205 obtains the total code amount of the coding results of pieces of attribute information which have been coded up to now, and determines whether the total code amount has exceeded a predetermined threshold (overflows) (step S404).

If the total code amount does not exceed the predetermined threshold, the process returns to step S401, and the attribute data counting unit 204 accepts the next attribute information. If the total code amount has exceeded the predetermined threshold, the process advances to step S405. A value held by the variable c0 at this time and that held by the variable c1 are compared with each other to determine which of "1" or "0" is set for the Nth bit of attribute information subsequently input to the attribute data coding unit 205 (step S405).

The process then advances to step S406, and the attribute data coding unit 205 changes the Nth bit of attribute information subsequently input to the attribute data coding unit 205 to a bit value which has been decided in step S405 (step S406), and codes the changed attribute information (step S407).

It is determined whether all pieces of attribute information have been coded (step S408). If all pieces of attribute information have been coded, the process ends; if all pieces of attribute information have not been coded, the process returns to step S406 to repeat the subsequent process for the next attribute information.

By the above process, all pieces of attribute information can be coded at a predetermined code amount or less.

Figure 5:
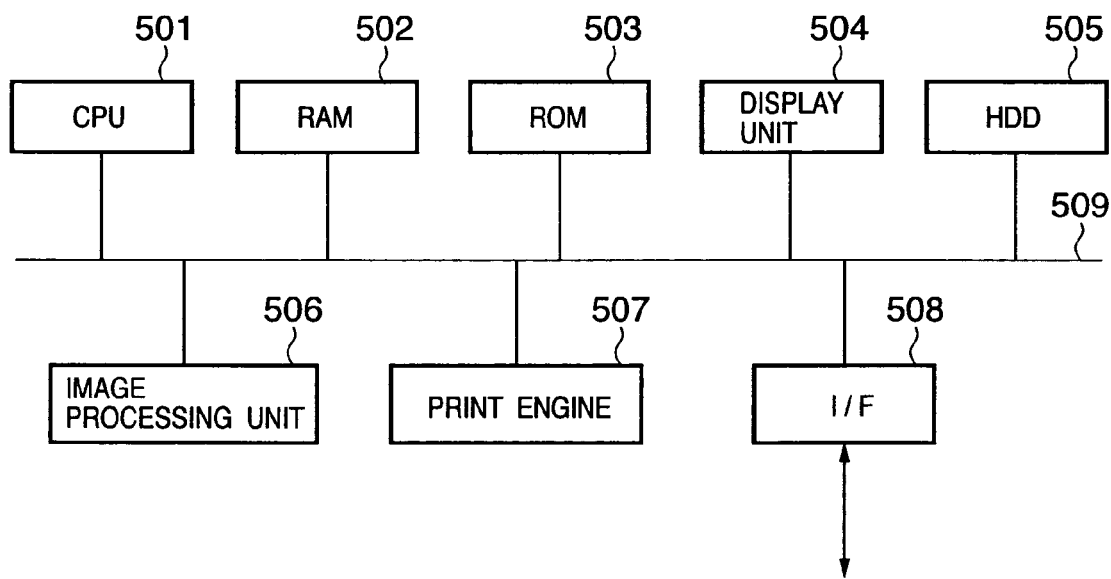
FIG. 5 is a block diagram showing the basic configuration of the multi-functional peripheral 102.

FIG. 5 is a block diagram showing the basic configuration of the multi-functional peripheral 102.

In FIG. 5, reference numeral 501 denotes a CPU which controls the overall multi-functional peripheral 102 by using programs and data that are stored in a RAM 502 and ROM 503, and executes the above-mentioned processes (including the process complying with the flowchart of FIG. 4) to be performed by the multi-functional peripheral 102. The CPU 501 functions as, e.g., the attribute data counting unit 204, attribute data coding unit 205, and attribute data decoding unit 207 in FIG. 2.

The RAM 502 has a work area necessary for the CPU 501 to execute each process, and an area for temporarily storing programs and data which are loaded from an HDD (Hard Disk Drive) 505. The RAM 502 functions as, e.g., the line buffers 203 and 208 in FIG. 2.

The ROM 503 stores programs and data which cause the CPU 501 to control the whole multi-functional peripheral 102, setting data and a boot program of the whole multi-functional peripheral 102, and the like.

Reference numeral 504 denotes a display unit which is formed from, e.g., a touch panel, and displays a current setting state, and button images for inputting various instructions.

The HDD 505 saves image data input from the scanner unit (not shown) of the multi-functional peripheral 102 or an external computer via an I/F 508. The HDD 505 also saves programs, data, and the like which cause the CPU 501 to execute the above-described processes (including the process complying with the flowchart of FIG. 4) to be performed by the multi-functional peripheral 102. The HDD 505 functions as, e.g., the storage unit 206 in FIG. 2.

Reference numeral 506 denotes an image processing unit which performs a predetermined image process for image data and attribute information, and sends the resultant data to a print engine 507.

As is well known, the print engine 507 prints on a medium such as paper on the basis of data sent from the image processing unit 506. The print engine 507 functions as, e.g., the printer unit 209 in FIG. 2.

The I/F 508 can connect the scanner unit and an external computer (e.g., the computer 101 in FIG. 1), and image data is accepted via the I/F 508.

Reference numeral 509 denotes a bus which connects the above units.

In the first embodiment, the number of pieces of attribute information in which the bit value of a predetermined bit in a bit string that forms attribute information is "1" is counted, and the number of pieces of attribute information in which the bit value of the predetermined bit is "0" is counted. When the size of coded data of pieces of attribute information reaches a predetermined amount, the count values are compared with each other to determine and change the bit value of the predetermined bit of attribute information to be coded. Alternatively, the bit value of the predetermined bit of attribute information may be changed by the following process.

The attribute data counting unit 204 reads out each attribute information sent to the line buffer 203, and acquires the bit value of a predetermined bit from a bit string which forms the attribute information. When the acquired bit value is "1", the attribute data counting unit 204 counts up by one a value held by the variable c1 (which is initialized to 0 at the beginning). When the size of coded data of attribute information reaches a predetermined amount, a value held by the variable c1 is compared with a predetermined threshold. When a value held by the variable c1>a predetermined threshold, in other words, when "the number of pixels which form a text area (among pixels corresponding to pieces of attribute information which have been read out from the line buffer 203 by the attribute data counting unit 204)" is much larger than "the number of pixels corresponding to pieces of attribute information which have been read out from the line buffer 203 by the attribute data counting unit 204", the same process as that for a value held by the variable c1>a value held by the variable c0 in the above description is executed.

To the contrary, when a value held by the variable c1<the predetermined threshold, in other words, when "the number of pixels which form a text area (among pixels corresponding to pieces of attribute information which have been read out from the line buffer 203 by the attribute data counting unit 204)" is much smaller than "the number of pixels corresponding to pieces of attribute information which have been read out from the line buffer 203 by the attribute data counting unit 204", the same process as that for a value held by the variable c1<a value held by the variable c0 in the above description is executed.

This also applies to a case wherein the variable c0 (which is initialized to 0 at the beginning) is counted up when an acquired bit value is "0". When a value held by the variable c0>a predetermined threshold, in other words, when "the number of pixels which form a photographic area (among pixels corresponding to pieces of attribute information which have been read out from the line buffer 203 by the attribute data counting unit 204)" is much larger than "the number of pixels corresponding to pieces of attribute information which have been read out from the line buffer 203 by the attribute data counting unit 204", the same process as that for a value held by the variable c1<a value held by the variable c0 in the above description is executed.

To the contrary, when a value held by the variable c0<the predetermined threshold, in other words, when "the number of pixels which form a photographic area (among pixels corresponding to pieces of attribute information which have been read out from the line buffer 203 by the attribute data counting unit 204)" is much smaller than "the number of pixels corresponding to pieces of attribute information which have been read out from the line buffer 203 by the attribute data counting unit 204", the same process as that for a value held by the variable c1>a value held by the variable c0 in the above description is executed.

In this fashion, the number of objects to be counted may be decreased. The counting method is not particularly limited.

Second Embodiment

In the first embodiment, the bit value of the Nth bit is changed for attribute information which is input to the attribute data coding unit 205 after the total code amount of coded data of pieces of attribute information reaches a predetermined amount. When, for example, a value held by the variable c1>a value held by the variable c0, most of pixels corresponding to pieces of attribute information which have been read out from the line buffer 203 by the attribute data counting unit 204 are those which form a text area. Thus, the Nth bits of all pieces of attribute information (i.e., pieces of coded attribute information) which are input to the attribute data coding unit 205 before the total code amount of coded data of pieces of attribute information reaches the predetermined amount may also be changed to "1".

In the second embodiment, a line buffer 203 holds attribute information which is input to an attribute data coding unit 205 before the total code amount of coded data of pieces of attribute information reaches a predetermined amount. Similar to the first embodiment, the Nth bit of the attribute information is changed, and the attribute information is coded. Attribute information input to the attribute data coding unit 205 after the total code amount of coded data of pieces of attribute information reaches the predetermined amount is changed and coded similarly to the first embodiment.

A system configuration according to the second embodiment is the same as that according to the first embodiment. In addition, the configuration of only a part associated with coding of attribute information that is extracted from the functional configuration of a multi-functional peripheral 102 is also the same as that according to the first embodiment. The second embodiment is slightly different from the first embodiment in a process which is executed by the attribute data coding unit 205 when the total code amount of coded data of pieces of attribute information reaches a predetermined amount. Only the difference will be explained.

When the current total code amount of coded data of pieces of attribute information exceeds a predetermined threshold (e.g., 60% of the capacity of a memory which holds coded data), the attribute data coding unit 205 discards coded data of attribute information which has already been coded, i.e., erases the coded data from the memory.

Similar to the first embodiment, a value held by the variable c0 and that held by the variable c1 are compared with each other. When a value held by the variable c1>a value held by the variable c0, it is determined necessary to change the bit value of the Nth bit to "1". When a value held by the variable c1<a value held by the variable c0, it is determined necessary to change the bit value of the Nth bit to "0".

The line buffer 203 stores pieces of attribute information input to the attribute data coding unit 205 before the total code amount of coded data of pieces of attribute information reaches the predetermined amount. Each attribute information is read out, and the Nth bit of the readout attribute information is changed to the determined bit value.

The attribute data coding unit 205 codes again the changed attribute information. Attribute information which is input to the attribute data coding unit 205 after the total code amount of coded data of pieces of attribute information reaches the predetermined amount is changed and coded similarly to the first embodiment. Since the Nth bits of all pieces of attribute information can be changed, the compression ratio becomes higher than that in the first embodiment. All pieces of attribute information coded in this manner are output to a storage unit 206.

In the second embodiment, when the current total code amount of coded data of pieces of attribute information exceeds a predetermined threshold (e.g., 60% of the capacity of a memory which holds coded data), the attribute data coding unit 205 discards coded data of attribute information which has already been coded. However, this process is not indispensable.

As a variable comparison method of determining which of "1" or "0" is set for the bit value of the Nth bit, either c0 or c1 may be compared with a predetermined threshold as described in the first embodiment, instead of comparing the two variables c0 and c1 with each other as described above.

Third Embodiment

In the first and second embodiments, when the current total code amount of coded data of pieces of attribute information exceeds a predetermined threshold (e.g., 60% of the capacity of a memory which holds coded data), how to change the attributes of all pieces of attribute information or those of pieces of attribute information to be coded after the total code amount exceeds the predetermined threshold is determined in accordance with a bit number counted by the attribute data counting unit 204 and a value to be counted. Alternatively, when the current total code amount of coded data of pieces of attribute information exceeds the predetermined threshold (e.g., 60% of the capacity of a memory which holds coded data), how to change the attributes of all pieces of attribute information or those of pieces of attribute information to be coded after the total code amount exceeds the predetermined threshold may be determined in advance.

Figure 6:
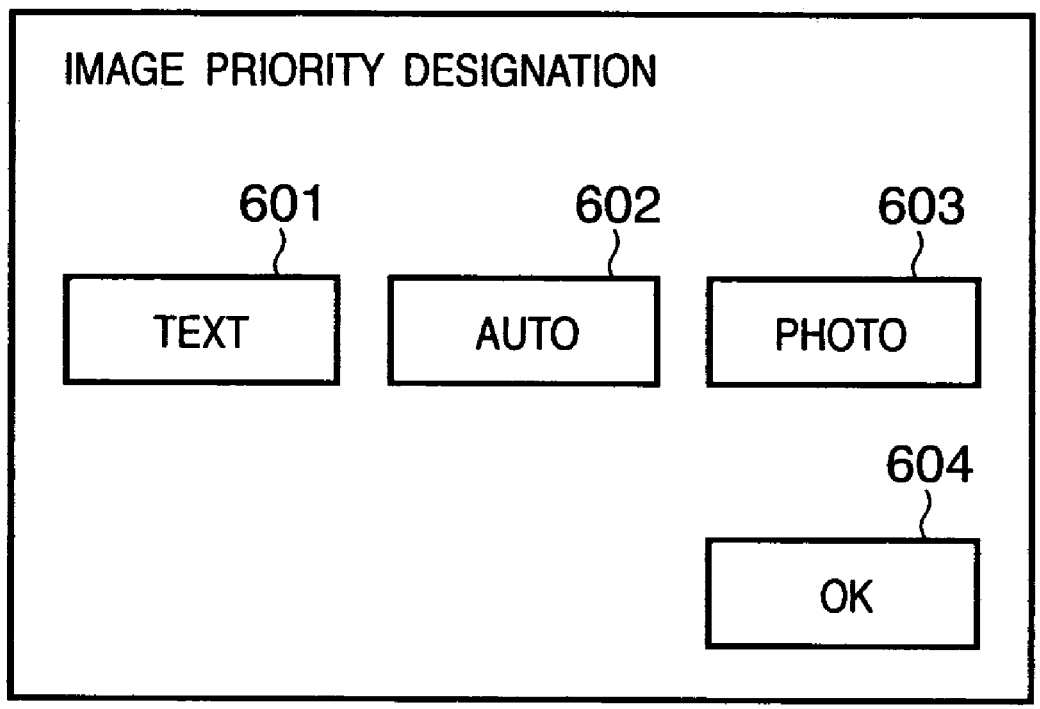
FIG. 6 is a view showing a display example of a GUI displayed on the display screen of a display unit 504.

FIG. 6 is a view showing a display example of a GUI displayed on the display screen of a display unit 504. In FIG. 6, reference numeral 601 denotes a button image for, when the current total code amount of coded data of pieces of attribute information exceeds a predetermined threshold, designating to change, to "text", the attributes of all pieces of attribute information or those of pieces of attribute information to be coded after the total code amount exceeds the predetermined threshold. Reference numeral 603 denotes a button image for, when the current total code amount of coded data of pieces of attribute information exceeds a predetermined threshold, designating to change, to "photo", the attributes of all pieces of attribute information or those of pieces of attribute information to be coded after the total code amount exceeds the predetermined threshold. Reference numeral 602 denotes a button image for, when the current total code amount of coded data of pieces of attribute information exceeds a predetermined threshold, designating to change, in accordance with the first or second embodiment, the attributes of all pieces of attribute information or those of pieces of attribute information to be coded after the total code amount exceeds the predetermined threshold.

For example, the button image 601 is designated before a printing process is performed. When the current total code amount of coded data of pieces of attribute information exceeds a predetermined threshold, an attribute data coding unit 205 changes, to "1", the sixth bits of all pieces of attribute information or those of pieces of attribute information to be coded after the total code amount exceeds the predetermined threshold. In this case, an attribute data counting unit 204 does not count any bit.

Alternatively, the button image 602 is designated before a printing process is performed. When the current total code amount of coded data of pieces of attribute information exceeds a predetermined threshold, the attribute data coding unit 205 changes, to "0", the sixth bits of all pieces of attribute information or those of pieces of attribute information to be coded after the total code amount exceeds the predetermined threshold. In this case, an attribute data counting unit 204 does not count any bit.

In this way, when the current total code amount of coded data of pieces of attribute information exceeds a predetermined threshold, it can be set which of "1" and "0" is set by the attribute data coding unit 205 for the sixth bits of all pieces of attribute information or those of pieces of attribute information to be coded after the total code amount exceeds the predetermined threshold. Note that a bit other than the sixth bit may be changed. For example, "chromatic color" and "achromatic color" button images may be further provided on the GUI in FIG. 6. When the "chromatic color" button image is designated before a printing process is performed, and the current total code amount of coded data of pieces of attribute information exceeds a predetermined threshold, the attribute data coding unit 205 changes, to "1", the 0th bits of all pieces of attribute information or those of pieces of attribute information to be coded after the total code amount exceeds the predetermined threshold. In this case, the attribute data counting unit 204 does not count any bit.

Also, when the "achromatic color" button image is designated before a printing process is performed, and the current total code amount of coded data of pieces of attribute information exceeds a predetermined threshold, the attribute data coding unit 205 changes, to "0", the 0th bits of all pieces of attribute information or those of pieces of attribute information to be coded after the total code amount exceeds the predetermined threshold. In this case, the attribute data counting unit 204 does not count any bit.

By designating an "OK" button image 604, a setting designated with any one of the button images is recorded in an HDD 505. In a process of changing a bit value in attribute information, a bit number and a value to which the bit is changed are acquired by referring to the set data.

Note that the display timing of the GUI as shown in FIG. 6 is not limited to a timing before a printing process. For example, the GUI may be displayed when the current total code amount of pieces of coded attribute information exceeds a predetermined threshold.

Fourth Embodiment

In the fourth embodiment, two images are composited, and in addition, pieces of attribute information of the composited images are also composited. How to change attribute information when the code amount of pieces of attribute information after composition exceeds a predetermined threshold is set with a GUI in advance.

FIG. 8 is a diagram showing the flow of a process of compositing two images. In FIG. 8, reference numeral 801 denotes one image to be composited; and 802, attribute information of the image 801. Reference numeral 803 denotes the other image to be composited; and 804, attribute information of the image 803. The images and their pieces of attribute information are compressed and saved in an HDD 505.

A case wherein the two images 801 and 803 which are compressed and saved in the HDD 505 are read out, composited, and printed will be explained.

The image 801 and attribute information 802 are read out from the HDD 505, and decompressed by a CPU 501 (806). At the same time, the image 803 and attribute information 804 are read out from the HDD 505, and decompressed by the CPU 501 (805), as described in the first embodiment.

The two decompressed images 801 and 803 are composited (807) to generate a composited image 809. The composited image 809 is compressed (811), and saved in the HDD 505 again. After that, such composited images are sequentially decoded and printed by a printer unit 209, as described in the first embodiment.

The pieces of decompressed attribute information 802 and 804 are composited (808) to generate composited attribute information 810. The composited attribute information 810 is compressed (812), and saved in the HDD 505 again. Thereafter, pieces of composited attribute information are sequentially decoded and used for image printing by the printer unit 209.

Figure 7:
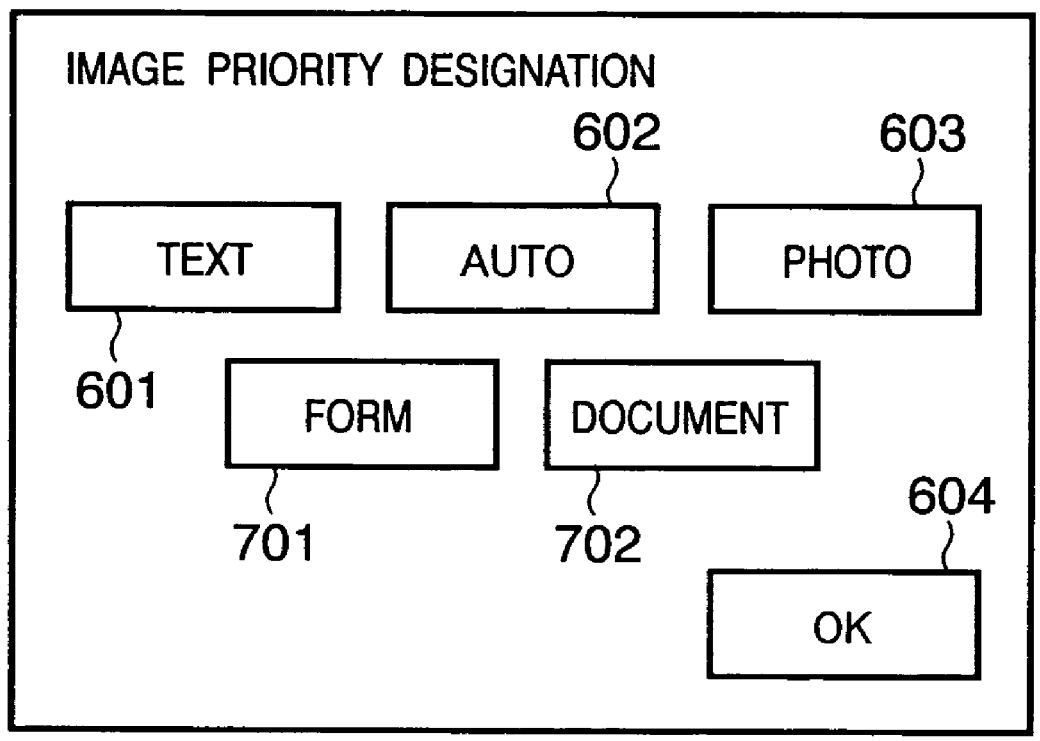
FIG. 7 is a view showing another display example of the GUI displayed on the display screen of the display unit 504.

When the code amount of compressed data reaches a predetermined amount in compressing the composited attribute information 810, how to change all pieces of composited attribute information 810 or pieces of composited attribute information 810 to be coded after the code amount exceeds the predetermined amount is set in advance on a GUI shown in FIG. 7. FIG. 7 is a view showing a display example of a GUI displayed on the display screen of a display unit 504. In FIG. 7, the same reference numerals as in FIG. 6 denote the same parts, and a description thereof will be omitted.

In FIG. 7, reference numeral 701 denotes a button image for, when the current total code amount of coded data of pieces of attribute information exceeds a predetermined threshold, designating to replace, with the attribute information 802, all pieces of composited attribute information 810 or pieces of composited attribute information 810 to be coded after the total code amount exceeds the predetermined threshold. Reference numeral 702 denotes a button image for, when the current total code amount of coded data of pieces of attribute information exceeds a predetermined threshold, designating to replace, with the attribute information 804, all pieces of composited attribute information 810 or pieces of composited attribute information 810 to be coded after the total code amount exceeds the predetermined threshold.

For example, the button image 701 is designated before a printing process is performed. When the current total code amount of coded data of pieces of attribute information exceeds a predetermined threshold, an attribute data coding unit 205 replaces, with the attribute information 802, all pieces of composited attribute information 810 or pieces of composited attribute information 810 to be coded after the total code amount exceeds the predetermined threshold. In this case, an attribute data counting unit 204 does not count any bit.

Alternatively, the button image 702 is designated before a printing process is performed. When the current total code amount of coded data of pieces of attribute information exceeds a predetermined threshold, the attribute data coding unit 205 replaces, with the attribute information 802, all pieces of composited attribute information 810 or pieces of composited attribute information 810 to be coded after the total code amount exceeds the predetermined threshold. In this case, the attribute data counting unit 204 does not count any bit.

Note that the display timing of the GUI as shown in FIG. 7 is not limited to a timing before a printing process. For example, the GUI may be displayed when the current total code amount of pieces of coded attribute information exceeds a predetermined threshold.

Other button images may also be provided on the GUI shown in FIG. 7, as described in the third embodiment.

Other Embodiment

The present invention can be implemented as a system, apparatus, method, program, storage medium, or the like. More specifically, the present invention may be applied to a system including a plurality of devices or an apparatus formed by a single device.

The present invention is also achieved by supplying a software program (in the above embodiments, a program corresponding to the flowchart shown in FIG. 4) for implementing the functions of the above-described embodiments to a system or apparatus directly or from a remote place, and reading out and executing the supplied program codes by the computer of the system or apparatus.

The present invention is therefore implemented by program codes installed in the computer in order to implement functional processes of the present invention by the computer. That is, the present invention includes a computer program for implementing functional processes of the present invention.

In this case, the present invention can be implemented as a program such as an object code, a program executed by an interpreter, or script data supplied to an OS as long as a program function is attained.

A recording medium for supplying the program includes a floppy® disk, hard disk, optical disk, magnetooptical disk, MO, CD-ROM, CD-R, CD-RW, magnetic tape, nonvolatile memory card, ROM, and DVD (DVD-ROM and DVD-R).

As another program supply method, the program can be supplied by connecting a client computer to an Internet Web page via the browser of the client computer, and downloading the computer program of the present invention or a compressed file containing an automatic installing function from the Web page to a recording medium such as a hard disk. The program can also be implemented by grouping program codes which form the program of the present invention into a plurality of files, and downloading the files from different Web pages. That is, the present invention also includes a WWW server which allows a plurality of users to download the program files for implementing functional processes of the present invention by a computer.

The program of the present invention can be encrypted, stored in a recording medium such as a CD-ROM, and distributed to the user. A user who satisfies predetermined conditions is prompted to download decryption key information from a Web page via the Internet. The user executes the encrypted program by using the key information, and installs the program in the computer.

The functions of the above-described embodiments are implemented when the computer executes the readout program codes. Also, the functions of the above-described embodiments are implemented when an OS or the like running on the computer performs some or all of actual processes on the basis of the instructions of the program codes.

The functions of the above-described embodiments are implemented when the program read out from the recording medium is written in the memory of a function expansion board inserted into the computer or the memory of a function expansion unit connected to the computer, and the CPU of the function expansion board or function expansion unit performs some or all of actual processes on the basis of the instructions of the program codes.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-267509 filed on Sep. 14, 2004, which is hereby incorporated by reference herein.

What is claimed is:

1. An image coding apparatus comprising:
at least one processor operatively coupled to a memory, serving as:
    an input unit that receives attribute information set for each pixel that forms an image and represents an attribute of the pixel;
    a coding unit that codes the attribute information input by said input unit;
    a code amount monitoring unit that obtains a total code amount by adding a code amount of coded data of the attribute information coded by the coding unit and a previously obtained code amount;
    a counting unit that counts the number of pieces of attribute information, in which a bit value of a predetermined bit in a bit string that forms the attribute information is a predetermined value, wherein the counting unit includes:
        a first counting unit that counts the number of pieces of attribute information, in which the bit value of a first bit in a bit string that forms the attribute information is a value representing a first attribute, and
        a second counting unit that counts the number of pieces of the attribute information, in which the bit value of the first bit in a bit stream that forms the attribute information is a value representing a second attribute;
    a change unit that changes, on the basis of a count value, a value of the predetermined bit in the attribute information input by the input unit when the total code amount obtained by the code amount monitoring unit reaches a predetermined amount, the change unit including:
        a determination unit that, when the total code amount obtained by the code amount monitoring unit reaches the predetermined amount, determines, on the basis of a magnitude relationship between a count value by said first counting unit and a count value by the second counting unit, which of the number of pieces of the attribute information representing the first attribute and the number of pieces of the attribute information representing the second attribute is larger among pieces of the attribute information which have been input by said input unit, and
        when the number of pieces of the attribute information representing the first attribute is determined to be larger from a determination result by the determination unit, the change unit changes, to the value representing the first attribute, values of first bits in pieces of the attribute information input by the input unit after the total code amount obtained by the code amount monitoring unit reaches the predetermined amount, and when the number of pieces of the attribute information representing the second attribute is determined to be larger, the change unit changes, to the value representing the second attribute, values of first bits in pieces of the attribute information input by the input unit after the total code amount obtained by the code amount monitoring unit reaches the predetermined amount;
    a coding control unit that causes the coding unit to code the attribute information changed by the change unit; and
    an output unit that outputs a coding result by the coding unit.

2. The apparatus according to claim 1, wherein the first attribute includes a text attribute, and the second attribute includes a photographic attribute.

3. The apparatus according to claim 1, wherein the first attribute includes a chromatic color, and the second attribute includes an achromatic color.

4. An image coding apparatus, comprising:
at least one processor operatively coupled to a memory, serving as:
    an input unit that receives attribute information set for each pixel that forms an image and which represents an attribute of the pixel;
    a coding unit that codes the attribute information input by the input unit;
    a code amount monitoring unit that obtains a total code amount by adding a code amount of coded data of the attribute information coded by the coding unit and a previously obtained code amount;
    a counting unit that counts the number of pieces of the attribute information, in which the bit value of a predetermined bit in a bit string that forms the attribute information is a predetermined value;
    a change unit that changes, on the basis of a count value, a value of the predetermined bit in the attribute information input by the input unit when the total code amount obtained by the code amount monitoring unit reaches a predetermined amount;
    a coding control unit that causes the coding unit to code the attribute information changed by the change unit; and an output unit that outputs a coding result by the coding unit, wherein the counting unit counts the number of pieces of the attribute information, in which a value of a first bit which takes one of a value representing a first attribute and a value representing a second attribute in the attribute information is a predetermined value, the change unit having a determination unit that, when the total code amount obtained by the code amount monitoring unit reaches the predetermined amount, determines, on the basis of a magnitude relationship between the value counted by the counting unit and a predetermined threshold, which of the number of pieces of the attribute information representing the first attribute and the number of pieces of the attribute information representing the second attribute is larger among pieces of the attribute information which have been input by the input unit, and when the number of pieces of the attribute information representing the first attribute is determined to be larger from a determination result by the determination unit, the change unit changes, to the value representing the first attribute, values of first bits in pieces of the attribute information input by the input unit after the total code amount obtained by the code amount monitoring unit reaches the predetermined amount, and when the number of pieces of the attribute information representing the second attribute is determined to be larger, the change unit changes, to the value representing the second attribute, values of first bits in pieces of the attribute information input by the input unit after the code amount obtained by the total code amount monitoring unit reaches the predetermined amount.

5. An image coding method comprising:

an input step of inputting attribute information set for each pixel that forms an image and which represents an attribute of the pixel;

a coding step of coding the attribute information input in the input step;

a code amount monitoring step of obtaining a total code amount by adding a code amount of coded data of the attribute information coded in the coding step and a previously obtained code amount;

a counting step of counting the number of pieces of attribute information, in which the bit value of a predetermined bit in a bit string that forms the attribute information is a predetermined value, wherein said counting step includes:

counting a first count value corresponding to the number of pieces of the attribute information, in which the bit value of a first bit in a bit string that forms the attribute information is a value representing a first attribute, and counting a second count value corresponding to the number of pieces of the attribute information, in which the bit value of the first bit in a bit string that forms the attribute information is a value representing a second attribute;

a change step of changing, on the basis of a count value, a value of the predetermined bit in the attribute information input in the input step when the total code amount obtained in the code amount monitoring step reaches a predetermined amount, wherein said change step includes:

when the total code amount obtained by said code amount monitoring reaches the predetermined amount, determining, on the basis of a magnitude relationship between the first count value and the second count value, which of the number of pieces of the attribute information representing the first attribute and the number of pieces of the attribute information representing the second attribute is larger among pieces of the attribute information which have been input by said inputting, and when the number of pieces of the attribute information representing the first attribute is determined to be larger from a determination result, changing, to the value representing the first attribute, values of first bits in pieces of the attribute information input by said inputting after the total code amount obtained by said code amount monitoring reaches the predetermined amount, and when the number of pieces of the attribute information representing the second attribute is determined to be larger, changing, to the value representing the second attribute, values of first bits in pieces of the attribute information input by said inputting after the total code amount obtained by said code amount monitoring reaches the predetermined amount,;

a coding control step of coding, in the coding step, the attribute information changed in the change step; and an output step of outputting a coding result in the coding step, wherein the above steps are performed by a computer.

6. A computer-readable storage medium having stored thereon a plurality of instructions, said plurality of instructions when executed by a processor, cause said processor to execute the image coding method defined in claim 5.

7. An image coding method, comprising:

an input step of inputting attribute information set for each pixel that forms an image and which represents an attribute of the pixel;

a coding step of coding the attribute information input in said input step;

a code amount monitoring step of obtaining a total code amount by adding a code amount of coded data of the attribute information coded in said coding step and a previously obtained code amount;

a counting step of counting the number of pieces of the attribute information, in which the bit value of a predetermined bit in a bit string that forms the attribute information is a predetermined value;

a change step of changing, on the basis of a count value, a value of the predetermined bit in the attribute information input in said input step when the total code amount obtained in said code amount monitoring step reaches a predetermined amount;

a coding control step of coding, in the coding step, the attribute information changed in said change step; and an outputting step of outputting a coding result in said coding step, wherein said counting step counts the number of pieces of the attribute information, in which a value of a first bit which takes one of a value representing a first attribute and a value representing a second attribute in the attribute information is a predetermined value, said change step comprises, when the total code amount obtained in said code amount monitoring step reaches the predetermined amount, determining, on the basis of a magnitude relationship between the value counted in said counting step and a predetermined threshold, which of the number of pieces of the attribute information representing the first attribute and the number of pieces of the attribute information representing the second attribute is larger among pieces of the attribute information which have been input in said input step, and when the number of pieces of the attribute information representing the first attribute is determined to be larger from a determination result in said determination step, said change step changes, to the value representing the first attribute, values of first bits in pieces of the attribute information input in said input step after the total code amount obtained in said code amount monitoring step reaches the predetermined amount, and when the number of pieces of the attribute information representing the second attribute is determined to be larger, said change step changes, to the value representing the second attribute, values of first bits in pieces of the attribute information input in said input step after the code amount obtained in said total code amount monitoring step reaches the predetermined amount, wherein the above steps are performed by a computer.

* * * * *